United States Patent
Ishida et al.

(10) Patent No.: US 8,009,414 B2
(45) Date of Patent: Aug. 30, 2011

(54) ELECTRONIC EQUIPMENT AND SHELF MEMBER

(75) Inventors: Yoichi Ishida, Tokyo (JP); Masato Suzuki, Tokyo (JP); Syuji Yamaguchi, Tokyo (JP)

(73) Assignee: NEC Personal Products, Ltd., Tokyo (JP)

( * ) Notice: Subject to any disclaimer, the term of this patent is extended or adjusted under 35 U.S.C. 154(b) by 593 days.

(21) Appl. No.: 12/084,315

(22) PCT Filed: Sep. 7, 2006

(86) PCT No.: PCT/JP2006/317752
§ 371 (c)(1),
(2), (4) Date: Apr. 30, 2008

(87) PCT Pub. No.: WO2007/052410
PCT Pub. Date: May 10, 2007

(65) Prior Publication Data
US 2009/0159542 A1    Jun. 25, 2009

(30) Foreign Application Priority Data
Nov. 4, 2005  (JP) ................ 2005-321133

(51) Int. Cl.
*G06F 1/16* (2006.01)
(52) U.S. Cl. .............. 361/679.25; 361/679.23; 248/174; 248/917
(58) Field of Classification Search .............. 361/679.25
See application file for complete search history.

(56) References Cited

U.S. PATENT DOCUMENTS

| | | | | |
|---|---|---|---|---|
| 3,991,966 A * | 11/1976 | Breer, II | ........... | 248/444 |
| 5,039,044 A * | 8/1991 | Sher | ........... | 248/125.1 |
| 5,108,062 A * | 4/1992 | Detwiler | ........... | 248/185.1 |
| 5,668,612 A * | 9/1997 | Hung | ........... | 348/818 |
| 6,024,337 A * | 2/2000 | Correa | ........... | 248/442.2 |
| 6,138,966 A * | 10/2000 | Smith | ........... | 248/176.1 |
| 6,366,452 B1 * | 4/2002 | Wang et al. | ........... | 361/679.22 |
| 6,522,530 B2 * | 2/2003 | Bang | ........... | 361/679.06 |
| 6,527,247 B1 * | 3/2003 | Jacob | ........... | 248/447 |
| 6,839,227 B1 * | 1/2005 | Correa | ........... | 361/679.23 |
| 6,909,598 B2 * | 6/2005 | Cheng et al. | ........... | 361/679.22 |
| 7,083,153 B1 * | 8/2006 | Delatorre | ........... | 248/309.1 |
| 7,341,235 B2 | 3/2008 | Okamoto | | |
| 7,433,185 B1 * | 10/2008 | Curran et al. | ........... | 361/679.41 |
| 7,546,995 B2 * | 6/2009 | Axel | ........... | 248/444 |

(Continued)

FOREIGN PATENT DOCUMENTS
JP            3069891        3/1991
(Continued)

*Primary Examiner* — Lisa Lea-Edmonds
*Assistant Examiner* — Anthony Q Edwards
(74) *Attorney, Agent, or Firm* — Foley & Lardner LLP

(57) ABSTRACT

The present invention includes flat-panel type display section (11), main body (12) which supports this flat-panel type display section (11), angle adjustment mechanism (13) for adjusting an inclination angle to a perpendicular direction of a display surface of flat-panel type display section (11), and shelf member (14) on which an article is to be placed. Then, as for shelf member (14), one end of the shelf member is provided near an upper edge of flat-panel type display section (11), and the other end of the shelf member is supported by main body (12). According to the present invention, since supporting plate (22) of shelf member (11) is supported by main body (12), shelf member (14) is not moved in connection with flat-panel type display section (11) when the display angle of flat-panel type display section (11) is adjusted by angle adjustment mechanism (13), and hence, the article is stably placed on shelf member (14).

13 Claims, 8 Drawing Sheets

U.S. PATENT DOCUMENTS

| | | |
|---|---|---|
| 7,551,432 B1 * | 6/2009 | Bockheim et al. ........ 361/679.27 |
| 2002/0060899 A1 * | 5/2002 | Bang ................ 361/681 |
| 2003/0063059 A1 * | 4/2003 | Farrow et al. .................. 345/92 |
| 2003/0168571 A1 * | 9/2003 | Malejko et al. ............ 248/447.1 |
| 2006/0152894 A1 * | 7/2006 | Moengen ...................... 361/681 |
| 2006/0290812 A1 * | 12/2006 | Hsu ................ 348/552 |
| 2007/0035829 A1 | 2/2007 | Woodgate et al. |
| 2010/0214730 A1 * | 8/2010 | Titzler et al. ............ 361/679.21 |

FOREIGN PATENT DOCUMENTS

| | | |
|---|---|---|
| JP | 3069891 | 4/2000 |
| JP | 2003-150069 A | 5/2003 |
| JP | 2004-153410 A | 5/2004 |
| JP | 2004-333744 (A) | 11/2004 |
| JP | 3687589 | 6/2005 |
| KR | 2003-0040079 (A) | 5/2003 |

* cited by examiner large screen PC

ELECTRONIC EQUIPMENT AND SHELF MEMBER

This application is the National Phase of PCT/JP2006/317752, filed Sep. 7, 2006, which claims priority to Japanese Application No. 2005-321133, filed Nov. 4, 2005, the disclosures of which are hereby incorporated by reference in their entirety.

TECHNICAL FIELD

The present invention relates to electronic equipment comprising a flat-panel type display section, such as a liquid crystal display panel, and a shelf member which is arranged above the flat-panel type display section, and on which an article is placed.

BACKGROUND ART

Heretofore, for example, a flat-panel type display apparatus, a personal computer comprising this flat-panel type display apparatus, and the like, are known as electronic equipment comprising a flat-panel type display section such as a liquid crystal display panel.

As for this kind of flat-panel type display apparatus, the display section housing which covers a flat-panel type display section is thin, and a sufficient area is not secured in the upper face of a housing of the display apparatus such as a so-called Braun tube system of display apparatus. For this reason, a flat-panel type display apparatus has inconvenience in which an article can not be placed on an upper face of a display section housing.

Then, as a conventional flat-panel type display apparatus, construction in which a shelf board for mounting an article above a back face of a flat-panel type display section is provided is disclosed in Japanese Patent Laid-Open No. 2004-153410. According to this conventional flat-panel type display apparatus, it is made possible to effectively use a space above the flat-panel type display section.

DISCLOSURE OF THE INVENTION

By the way, some conventional flat-panel type display apparatuses generally comprise an angle adjustment mechanism for adjusting an inclination angle to the perpendicular direction of a display surface of a flat-panel type display section, and the flat-panel type display section is supported by a supporting table by the angle adjustment mechanism. In this conventional flat-panel type display apparatus, an inclination angle of the display surface is adjusted by the angle adjustment mechanism according to the position of the user's line of sight, etc.

When such an angle adjustment mechanism was provided, since a shelf board was fixed to the flat-panel type display section in the construction disclosed by patent document 1, there was a problem that, when the display surface of the flat-panel type display section was inclined, the shelf board also inclined with the flat-panel type display section, and hence, it became impossible to use the shelf board or that an article placed on the shelf board would fall.

Thus, an object of the present invention is to provide electronic equipment in which an article can be stably placed on a shelf member irrespective of a state of the display angle of the flat-panel type display section, and the shelf member.

In order to achieve the object mentioned above, the electronic equipment according to the present invention comprises a flat-panel type display section, a supporting section which supports this flat-panel type display section, an angle adjustment mechanism for adjusting the display angle of the flat-panel type display section, and a shelf member on which an article can be placed. Then, one end of the shelf member is provided near an upper edge of the flat-panel type display section, and the other end of the shelf member is supported by the supporting section.

The electronic equipment according to the present invention configured as above, since a supporting plate of the shelf member is supported by the supporting section, the shelf member is also not moved in connection with the flat-panel type display section when a display angle of the flat-panel type display section is adjusted by the angle adjustment mechanism, and hence, an article can be stably placed on the shelf member.

In addition, the supporting section included in the electronic equipment according to the present invention, includes a control section which controls information outputted to the flat-panel type display section, and a housing which covers this control section. Then, the shelf member may be supported by the housing.

Furthermore, the supporting section included in the electronic equipment according to the present invention, includes a control section which controls information outputted to the flat-panel type display section, a housing which covers this control section, and a supporting table which not only supports this housing, but also supports the flat-panel type display section by the angle adjustment mechanism. Then, the shelf member may be fixed to the supporting table.

Moreover, the shelf member included in the electronic equipment according to the present invention preferably includes screw holes for screwing it to the supporting section, and latch means which is latched by the supporting section. According to this configuration, since it becomes possible to screw shut the shelf member stably by using the screw holes in a state of latching the shelf member to the supporting section by the latch means, it is possible to install the shelf member easily in the supporting section.

In addition, the shelf member included in the electronic equipment according to the present invention may be provided with a plurality of screw holes and latch means for installing it selectively to the supporting section according to two or more kinds of flat-panel type display sections that have display surfaces with different sizes. According to this construction, since it becomes possible to install two or more kinds of flat-panel type display sections in the supporting section and since the shelf member is commonized, reducing manufacturing cost is achieved.

Furthermore, the supporting plate of the shelf member included in the electronic equipment according to the present invention comprises may be fixed to a front side of the housing which faces a back face of the flat-panel type display section. According to this configuration, it becomes possible to radiate heat, which was generated from inside of the supporting section, to the outside well, since the back face and an upper face side of the housing, in which the heat generated in the supporting section is emitted, is not covered by the supporting plate.

In addition, a shelf member according to the present invention, is installed in electronic equipment, comprising a flat-panel type display section, a supporting section which supports this flat-panel type display section, and an angle adjustment mechanism for adjusting a display angle of the flat-panel type display section, and on which an article is placed, and one end of the shelf member is provided near an upper edge of the flat-panel type display section, and the other end of the shelf member is supported by the supporting section.

According to the present invention, since the shelf member does not move irrespective of the state of the display angle of the flat-panel type display section, it is possible to place an article stably on the shelf member.

BEST MODE FOR CARRYING OUT THE INVENTION

Hereafter, specific exemplary embodiments of the present invention will be described with reference to drawings.

As electronic equipment according to the present invention, a personal computer (PC) where a flat-panel type display section and a main body are integrated will be described as an example.

First Exemplary Embodiment

Figure 1A:
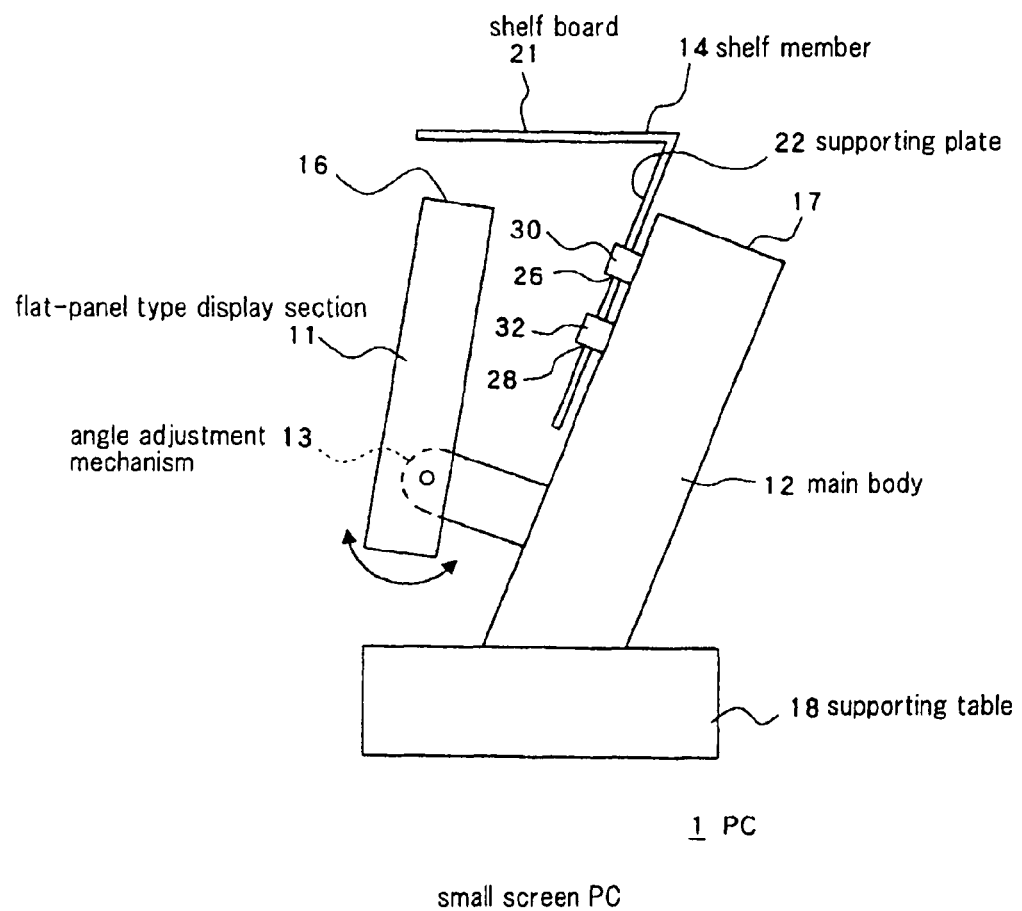
FIG. 1A is a side view illustrating schematically an example of a personal computer of an exemplary embodiment.
Figure 1B:
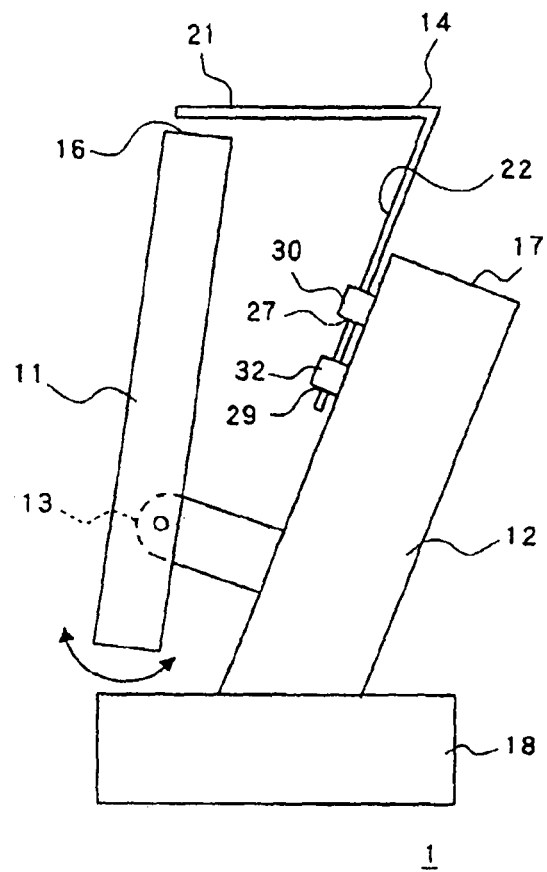
FIG. 1B is a side view illustrating schematically another example of a personal computer of an exemplary embodiment.
Figure 2:
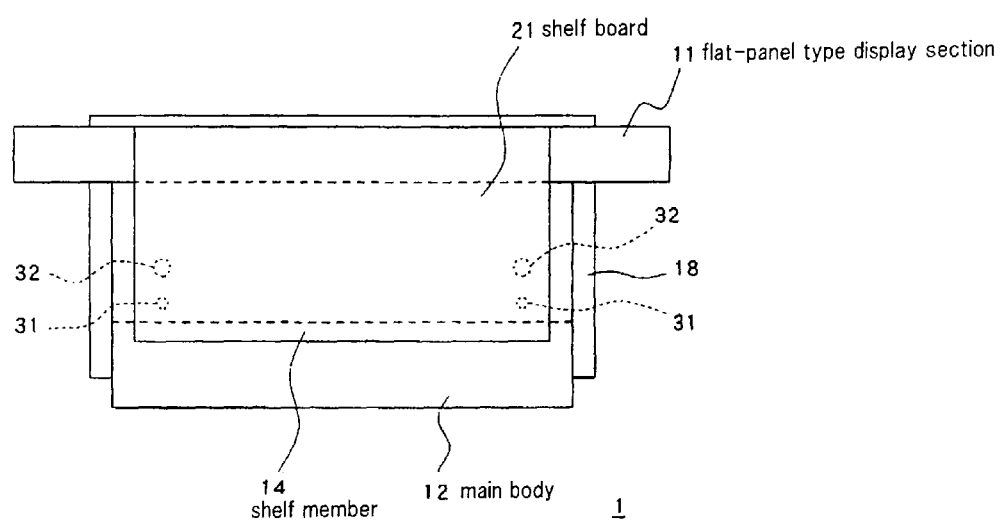
FIG. 2 is a top view illustrating schematically the above-mentioned personal computer.

As illustrated in FIGS. 1A, 1B, and 2, PC 1 of a first exemplary embodiment comprises flat-panel type display section 11 which displays a picture, main body 12 which supports this flat-panel type display section 11, angle adjustment mechanism 13 for adjusting an inclination angle to a perpendicular direction of a display surface of flat-panel type display section 11, and shelf member 14 for placing an article thereon.

Flat-panel type display section 11 has a liquid crystal display panel (not illustrated) which displays a picture, and display section housing 16 which covers this liquid crystal display panel. In addition, flat-panel type display section 11 is not limited to a liquid crystal display panel, but, for example, a thin display panel, such as a plasma display panel, or an EL panel using electroluminescence devices, may be used.

Main body 12 has a control circuit section (not illustrated) in which a CPU (Central Processing Unit), which controls information, such as a picture signal, which is outputted to flat-panel type display section 11, and the like are provided, main body housing 17 which covers this control circuit section, and supporting table 18 which supports this main body housing 17.

In main body housing 17 of main body 12, for example, a DVD (Digital Versatile Disc) drive, an HD (Hard Disk) drive, and the like, which are not illustrated, are provided. In addition, main body housing 17 is provided aslant at a predetermined inclination angle to a perpendicular direction on supporting table 18.

As for angle adjustment mechanism 13, one end is fixed to flat-panel type display section 11, and the other end is fixed to main body 12. Angle adjustment mechanism 13 is made adjustable in the inclination angle, for example to the perpendicular direction within the range from "−" 5°, which turns a display surface downward, to "+" 20° which turns the display surface upward. In addition, angle adjustment mechanism 13 may be constructed as a rotating mechanism which adjusts a rotation angle of a display surface of flat-panel type display section 11 around an axis in a perpendicular direction, that is, adjusts a direction of the display surface to a crosswise direction. This rotating mechanism is made so that it can adjust, for example, the display surface of the flat-panel type display section 11 within a range of about 20° in each of the right and left directions.

In addition, as angle adjustment mechanism 13, what is necessary is just a mechanism in which at least one angle of an inclination angle to a perpendicular direction of a display surface of flat-panel type display section 11 and a rotation angle in a crosswise direction of the display surface is adjusted, or, of course, it is also good to construct it so that it can adjust both the inclination angle and rotation angle respectively.

Figure 4:
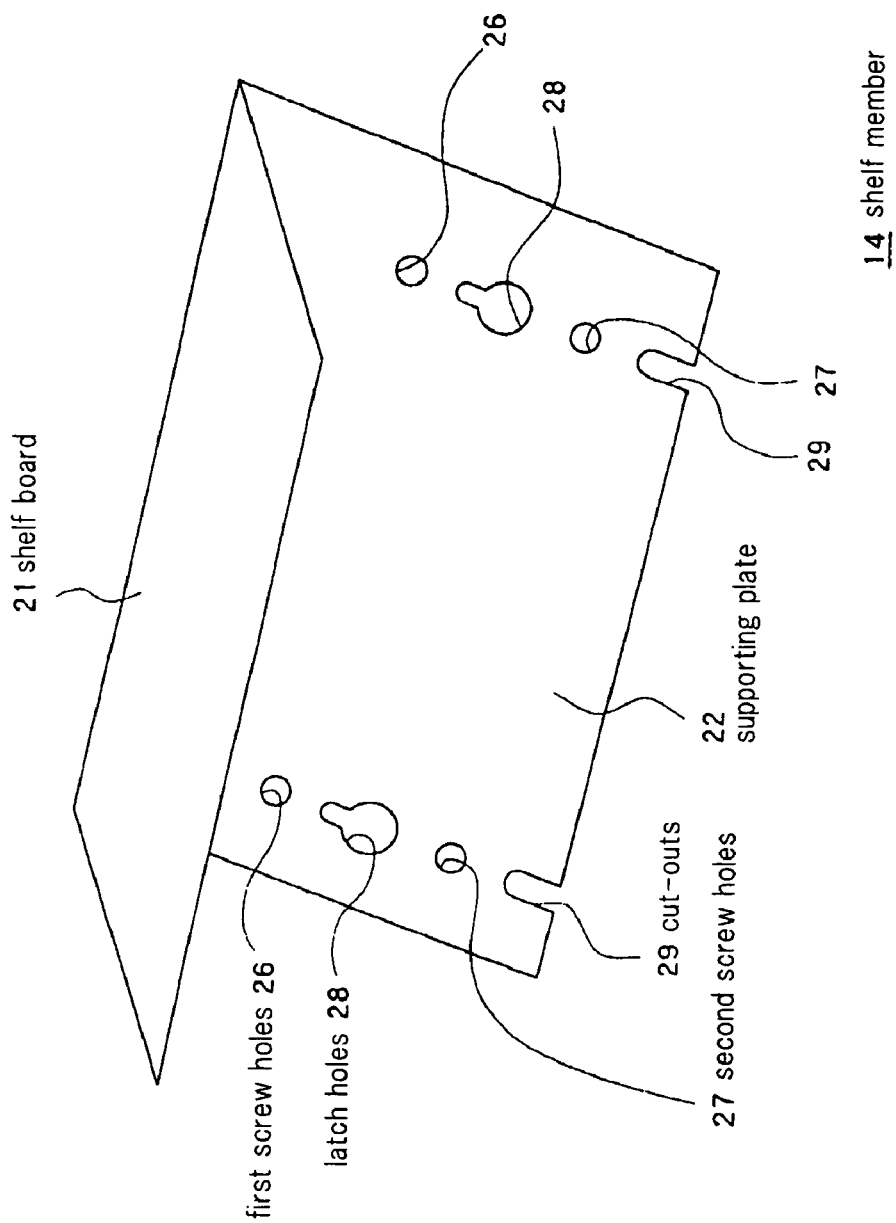
FIG. 4 is a perspective view illustrating a shelf member schematically.

Shelf member 14 is formed tabularly of, for example, a metal material or a resin material with comparatively high rigidity, and, as illustrated in FIGS. 1A and 1B, and FIG. 4, it has shelf board 21 provided near an upper edge of flat-panel type display section 11, and supporting plate 22 which is connected to this shelf board 21 and is supported by main body 12.

Shelf board 21 is formed by bending against supporting plate 22 that has an angle almost equal to an inclination angle to a perpendicular direction of main body housing 17 provided on supporting table 18, and is made almost parallel to a horizontal direction.

In addition, a location where angle adjustment mechanism 13 is supported by main body 12, is placed below a location where supporting plate 22 of shelf member 14 is supported by main body 12.

As illustrated in FIG. 1A and FIG. 1B, in supporting plate 22 of shelf member 14, for example, so as to install supporting plate 22 selectively to main body 12 respectively according to large and small flat-panel type display sections 11 having display surface with different sizes, first screw holes 26 and latch holes 28 for a small screen, and second screw holes 27 and cut-outs 29 for a big screen are provided respectively. First and second screw holes 26 and 27 are formed in the same diameter. Cut-outs 29 are formed in a bottom end of supporting plate 22.

Figure 3:
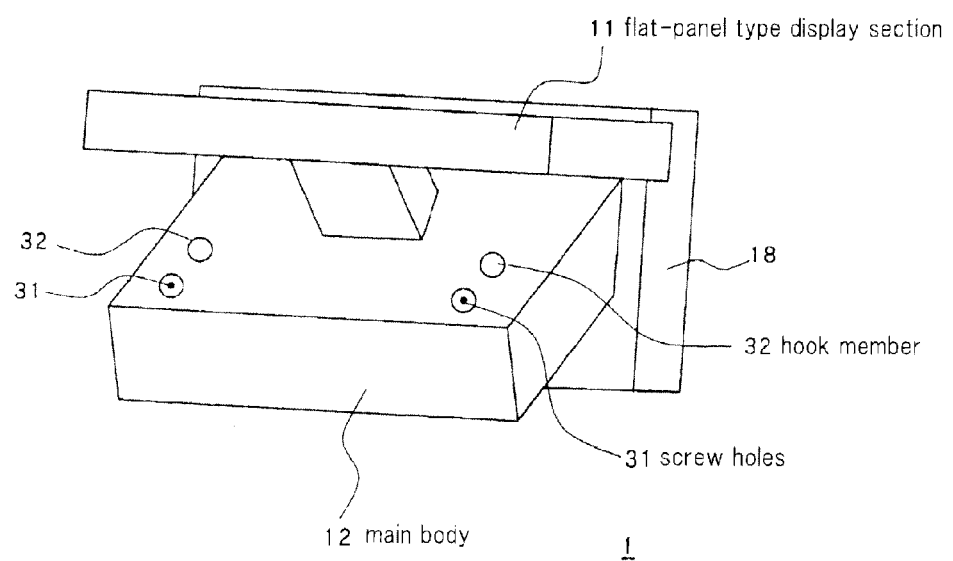
FIG. 3 is a perspective view illustrating a main body schematically from the above.

In addition, as shown in FIG. 3, in main body housing 17 of main body 12, screw holes 31, where fixing screws 30 that have been inserted into respectively first and second screw holes 26 and 27 are screwed in, and hook members 32 by which latch holes 28 or cut-outs 29 are latched, are provided in a front side which faces a back face of flat-panel type display section 11, respectively.

Because screw holes 26 and 27, and latch holes 28 and cut-outs 29 are provided in supporting plate 22 respectively, by performing a screw clamp in a state in which latch holes 28 or cut-outs 29 are latched by hook members 32 when supporting plate 22 is screwed and installed to main body housing 17, it is made possible to easily mount shelf member 14 to main body 12.

Because shelf member 14 has first and second screw holes 26 and 27, it becomes possible for them to correspond to two or more kinds of flat-panel type display sections 11 that have display surfaces with different sizes, and hence reducing manufacturing cost is achieved by making the shelf member a commonly used part. In addition, although not illustrated, it is needless to say that screw holes and latch holes for other screen sizes may be provided in shelf member 14 if needed.

In addition, so-called perforated metal, where a plurality of through holes (not shown) are provided in identical sizes to above-described screw holes 26 and 27 throughout supporting plate 22 and shelf board 21, is used for shelf member 14, and hence, not only weight saving is achieved, but also good heat dissipation is secured. Since the plurality of through holes is provided in shelf member 14, it is made possible to radiate heat smoothly to the outside without supporting plate 22 itself of shelf member 14 storing heat generated from flat-panel type display section 11. Furthermore, since the plurality of through holes are provided throughout supporting plate 22 in shelf member 14, presence of screw holes not being used is not conspicuous and good external appearance is secured.

In addition, as for shelf member 14, since supporting plate 22 is fixed to the front side of main body housing 17, a back face side and an upper face side of main body housing 17, from which heat generated in a control circuit section and the like in main body 12 is emitted, are not covered by supporting plate 22. For this reason, according to shelf member 14, heat that was generated in main body 12 is prevented from being enclosed, and the heat can be smoothly radiated to the outside.

Figure 5:
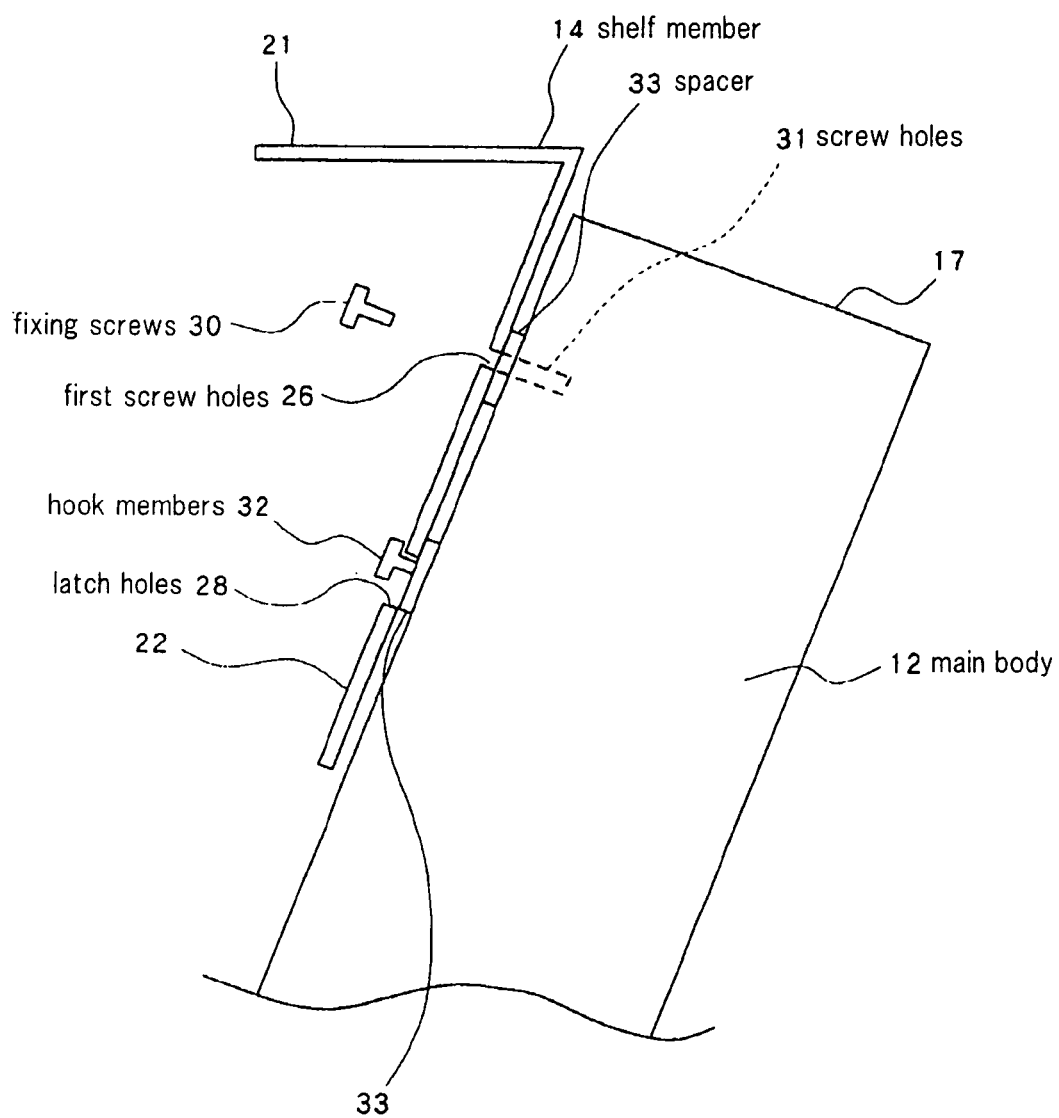
FIG. 5 is a side view illustrating schematically a state where a supporting plate of the shelf member is fixed to the main body.

As shelf member 14, when supporting plate 22 is fixed to main body housing 17, as illustrated in FIG. 5, disc-like spacer 33 is sandwiched and arranged between supporting plate 22 and a side face of main body housing 17, a predetermined gap is secured with a thickness of this spacer 33, and supporting plate 22 is fixed without abutting on main body housing 17. For this reason, main body housing 17 is prevented from being damaged by shelf member 14.

Shelf member 14 is used by an article being placed on shelf board 21 in PC 1 constructed as described above. Then, in PC 1, when a display surface of flat-panel type display section 11 is inclined to a perpendicular direction by angle adjustment mechanism 13, for example, when a fingertip or the like is inserted between flat-panel type display section 11 and shelf board 21 of shelf member 14 to a perform moving operation of flat-panel type display section 11 through angle adjustment mechanism 13, an inclination angle of the display surface is changed arbitrarily. At this time, the display surface of flat-panel type display section 11 inclines independently of shelf member 14 fixed to main body 12. For this reason, in shelf member 14, the state of an article which is placed on shelf board 21 does not change since a horizontal state of shelf board 21 is maintained irrespective of the tilt state of flat-panel type display section 11.

As mentioned above, according to PC 1, by comprising shelf member 14 which is provided by supporting plate 22 being fixed to main body housing 17, shelf member 14 is not moved when the display surface of flat-panel type display section 11 is tilted, and hence, it is possible to keep an article in a state of being placed stably on shelf board 21 of shelf member 14 irrespective of the state in which the display surface of flat-panel type display section 11 has been tilted by angle adjustment mechanism 13. Hence, according to this PC 1, it is possible to use the space above flat-panel type display section 11 effectively.

Second Exemplary Embodiment

Although the construction in which flat-panel type display section 11 is supported by main body 12 through angle adjustment mechanism 13 is adopted in PC 1 of the exemplary embodiment mentioned above, construction in which a flat-panel type display section is supported by a supporting table which supports a main body may be adopted. In addition, since construction of each portion is the same, although the layout of each portion is different, in this exemplary embodiment, in comparison with that in the exemplary embodiment mentioned above, for convenience, the same reference numerals as those in the above-described exemplary embodiment are assigned to each section and its description is omitted.

Figure 6:
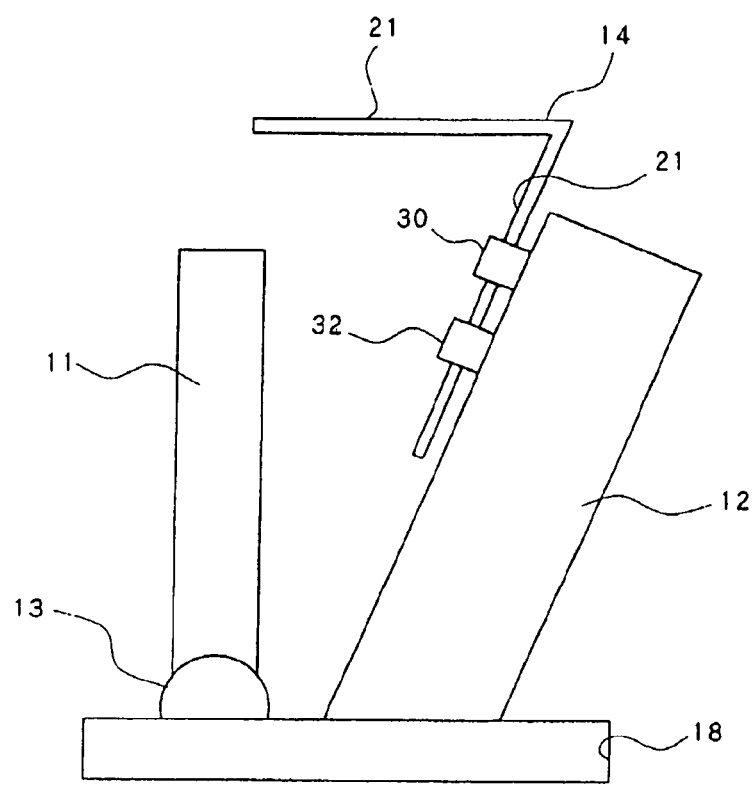
FIG. 6 is a side view illustrating a display apparatus of a second exemplary embodiment schematically.

As illustrated in FIG. 6, PC 2 of this exemplary embodiment comprises flat-panel type display section 11, supporting table 18 which supports this flat-panel type display section 11 through angle adjustment mechanism 13, main body 12 provided on this supporting table 18, and shelf member 14 supported by this main body 12.

According to PC 2 of this exemplary embodiment, since shelf member 14 whose supporting plate 22 is fixed to main body housing 17 is provided, it becomes possible to place an article stably on shelf board 21 of shelf member 14 irrespective of the state of a display surface of flat-panel type display section 11 is tilted, and the same advantageous effect as that of PC 1 mentioned above is obtained.

In addition, this is not shown, but, although the construction in which shelf member 14 is supported by main body 12 is adopted in PC 2 of this exemplary embodiment, this is not shown, but, it is needless to say that, for example, a construction in which supporting plate 22 of shelf member 14 is fixed on supporting table 18 may be adopted.

Third Exemplary Embodiment

Although each of the above-described respective exemplary embodiments is constructed as PCs 1 and 2 to comprise flat-panel type display section 11, and main body 12 which has a control circuit section which controls information, such as a picture outputted to this flat-panel type display section 11, the present invention may be constructed as a flat-panel type display apparatus which does not comprise a main body. In addition, since this exemplary embodiment is equivalent to the configuration without main body 12 in PC 2 of the second exemplary embodiment mentioned above, and fixing shelf member 14 to supporting table 18, for convenience, the same reference numerals as those in the above-described exemplary embodiments are assigned to the same sections and their descriptions are omitted.

Figure 7:
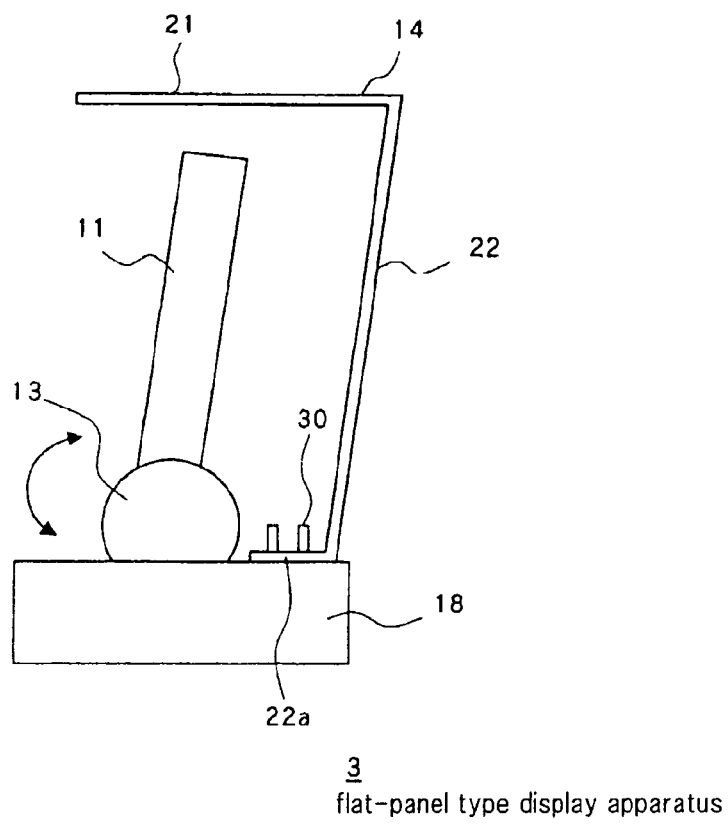
FIG. 7 is a side view illustrating schematically the above-mentioned personal computer of a third exemplary embodiment.

For example, as illustrated in FIG. 7, display apparatus 3 of the third exemplary embodiment comprises flat-panel type display section 11, supporting table 18 which supports this flat-panel type display section 11 through angle adjustment mechanism 13, and shelf member 14 whose supporting plate 22 is fixed on supporting table 18. In addition, as for supporting plate 22, bottom end 22a is fixed to an upper face of supporting table 18 with fixing screws 30.

As mentioned above, according to display apparatus 3, since shelf member 14 whose supporting plate 22 is fixed on supporting table 18 is provided, similarly to PCs 1 and 2 of the respective exemplary embodiments mentioned above, it is possible to place an article stably on shelf board 21 of shelf member 14 irrespective of the state in which the display surface of flat-panel type display section 11 is tilted.

In addition, although personal computers and flat-panel type display apparatuses of the exemplary embodiments are cited as examples of the electronic equipment according to the present invention, so long as the electronic equipment has construction of comprising a flat-panel type display apparatus, this is suitable for other electronic equipment such as a recording and reproducing apparatus in which an optical disk drive, such as DVD, or a hard disk drive in a main body is provided.

The invention claimed is:

1. An electronic equipment, comprising:
   a flat-panel type display section;
   a supporting section which supports said flat-panel type display section;
   an angle adjustment mechanism for adjusting a display angle of said flat-panel type display section; and
   a shelf member on which an article is to be placed, wherein, as for said shelf member, one end of said shelf member is provided near an upper edge of said flat-panel type display section, and the other end of said shelf member is supported by said supporting section,
   wherein said supporting section supports said flat-panel type display section through said angle adjustment mechanism, and wherein said angle adjustment mechanism is located at a downside of a center of a vertical direction of said supporting section.

2. The electronic equipment according to claim 1, wherein said angle adjustment mechanism adjusts an inclination angle to a perpendicular direction of a display surface of said flat-panel type display section.

3. The electronic equipment according to claim 1, wherein said angle adjustment mechanism adjusts a rotation angle around an axis in a perpendicular direction of a display surface of said flat-panel type display section.

4. The electronic equipment according to claim 1, wherein said supporting section has a control section which controls information outputted to said flat-panel type display section, and a housing which covers said control section; and
   wherein said shelf member is supported by said housing.

5. The electronic equipment according to claim 4, wherein said flat-panel type display section is supported by said housing through said angle adjustment mechanism; and
   wherein a location, where said angle adjustment mechanism is supported by said housing, is placed below a location, where said shelf member is supported by said housing.

6. The electronic equipment according to claim 1, wherein said supporting section has a control section which controls information outputted to said flat-panel type display section, a housing which covers said control section, and a supporting table which not only supports said housing, but also supports said flat-panel type display section through said angle adjustment mechanism; and
   wherein said shelf member is fixed to said housing.

7. The electronic equipment according to claim 1, wherein said shelf member has a shelf board provided near an upper edge of said flat-panel type display section, and a supporting plate which is connected to said shelf board and supported by said supporting section.

8. The electronic equipment according to claim 7, wherein said supporting plate of said shelf member is fixed to a front side of said housing which faces a back face of said flat-panel type display section.

9. The electronic equipment according to claim 1, wherein said shelf member has a screw hole for performing a screw clamp to said supporting section, and latch means latched by said supporting section.

10. The electronic equipment according to claim 9, wherein, said shelf member is provided with plurality of said screw holes and said latch means for installing said shelf member selectively to said supporting section according to two or more kinds of said flat-panel type display sections having display surfaces with different sizes.

11. The electronic equipment according to claim 1, wherein said shelf member does not support said flat-panel type display section.

12. A shelf member which is installed in electronic equipment which comprises a flat-panel type display section, a supporting section which supports said flat-panel type display section, and an angle adjustment mechanism for adjusting a display angle of said flat-panel type display section, and on which an article is placed, wherein one end of said shelf member is provided near an upper edge of said flat-panel type display section, and the other end of said shelf member is supported by said supporting section,
   wherein said supporting section supports said flat-panel type display section through said angle adjustment mechanism, and wherein said angle adjustment mechanism is located at a downside of a center of a vertical direction of said supporting section.

13. The shelf member according to claim 12, wherein said shelf member has a shelf board provided near an upper edge of said flat-panel type display section, and a supporting plate which is connected to said shelf board and supported by said supporting section.

* * * * *